UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

COMMINUTED CARBON AND PROCESS OF MAKING SAME.

1,188,936.      Specification of Letters Patent.      Patented June 27, 1916.

No Drawing.      Application filed November 17, 1915. Serial No. 61,903.

*To all whom it may concern:*

Be it known that I, PAUL RALPH HERSHMAN, a citizen of Austria-Hungary, residing at Chicago, in the county of Cook and State of Illinois, have invented certain new and useful Improvements in Comminuted Carbon and Processes of Making Same, of which the following is a specification.

My invention pertains to an improved comminuted carbon or carbon black, which may be advantageously employed as a high-class pigment, such as is used for oil and other paints, and may be used for the manufacture of electrodes and other carbon structures, the invention also covering the method by which this product is attained.

I have discovered that the so-called "hull bran" of cotton-seed, by means of this process, produces a finely divided carbon or carbon black of unusually good qualities, such as color, body, hue, and the like.

In the manufacture of commercial cotton and cotton-seed oil, the cotton, as it is picked in the field, is sent to the gins and the long staple cotton removed from the seeds in the usual manner. Then by means of a linter, the short staple cotton is separated from the seeds and the latter are conveyed to a hulling machine, where they are decorticated or chopped in such a way that the kernels readily separate from the shells or hulls of the seeds. These chopped, mixed kernels and hulls are separated by means of agitated screens, and the kernels or meats, after being crushed and cooked are subjected to heavy pressure to express the cotton-seed oil. The broken hulls or shells still have adhering to them cotton of extremely short staple, known as cotton-fiber, and this is removed from the shells or husks by means of an attrition mill, which breaks up the hulls into a more or less coarse powder, known in the trade as "hull bran". This by-product, hull bran, has a certain value as fuel, but it can be used to much more advantage by means of this improved process for the production of finely-divided carbon suitable for various purposes in the arts and sciences. This hull bran, which is naturally more or less moist, is first treated at temperatures of about 120° to 140° centigrade for a sufficient length of time to drive off all or practically all of the moisture, and at these temperatures the organic matter contained therein is not decomposed. The exact temperatures specified are not essential, it simply being desirable to heat the bran sufficiently both as to time and temperature to practically eliminate the moisture. This removal of the moisture seemingly prevents it from attacking the finely-divided carbon formed at the higher temperatures afterward employed in the subsequent distilling operation. The dried product is then preferably crushed and that portion of about 200 mesh fineness and under is separated from the remainder, and each of the two portions is independently subjected to the further treatment specified below, the finer material resulting in a considerably higher grade of product than the other. Each of such portions of the dried product is subjected to a temperature of dull red heat in a retort, preferably iron, without access of air, and this temperature is maintained until the flow of distillation products ceases, which ordinarily requires several hours, the distillate consisting of one or more tarry layers and an acid water layer containing several ingredients. The retort is heated by external means, as for instance, by producer gas, and the distilled gases which are not capable of condensing may, if desired, be burned under the retort to assist in maintaining the required temperature. The carbonized residue in the retort is reduced to 200 mesh fineness or still finer, and is preferably treated with an acid and alkali, as for example, with a 10% solution of hydrochloric acid, or a 10% solution of a mixture of hydrochloric and hydrofluoric acids or a 10% solution of a mixture of hydrochloric and nitric acids, and a 10% solution of a suitable caustic alkali, such as sodium hydroxid. The material is first treated with the acid, which assists in the removal of certain of the ash constituents. It is then washed with water and treated with the sodium hydroxid solution, which eliminates other ingredients which the acid does not readily attack, particularly certain decomposition products which have a tendency to give the pigment a brownish tinge. The caustic alkali also improves the drying capabilities of the product when the latter is used as a pigment and mixed with oils. This sodium hydroxid is somewhat difficult to wash out completely, and, after being treated with water, the material is again subjected to the acid treatment, which assists in the removal of the alkali, of which traces might otherwise remain. Then the material is washed neutral with water, dried at a low heat, and may or may not be calcined in an iron crucible, as circumstances may dictate. This refining process in some instances, is followed by grinding and recalcination to eliminate the last traces of adherent or inclosed oil.

By practising this method, the ash in the carbon is reduced from about 7% to ½% or less so that the final product comprises at least 99½% of pure carbon, and the process results in a comminuted carbon or carbon black of a deep bluish tinge instead of a brownish tint, which results largely from the removal of the iron salts by the acid treatment specified.

In the course of the process of extraction the liquids used, more particularly those containing acid (which latter are used over and over if the acid consumed is replaced), are gradually enrichened in potassium salts. They are finally evaporated, preferably after eliminating impurities such as calcium and other salts, and yield on evaporation a product containing 80% and more of potassium chlorid.

It should be noted that by separating the original hull bran into two portions of different fineness, as referred to above and independently subjecting the separate portions to the destructive distillation and refining specified, two carbons are obtained which are practically the same in chemical analyses both before and after the removal of the ash, but their physical properties are quite different, the carbon obtained from the finer sifted hull bran having a specific gravity of only about one-half as high as that of the other portion. It is quite probable that by the screening operation the two qualities of bran are separated from one another, which, however, in the original bran are closely combined.

Although in this specification I have indicated various proportions of ingredients, temperatures, periods, etc., it is to be understood that these may be varied within comparatively wide limits without departure from the invention and without the sacrifice of any of its substantial benefits and advantages. For example, the treatment with alkali without the employment of the acid may in some cases be advantageously used since the alkali of itself removes oil and mineral and other substances not readily attacked by the acid and whose removal is desirable to secure a product of high grade.

I claim:

1. A practically-pure comminuted carbon consisting of the pulverulent residue of the destructive distillation of vegetable integuments, practically free from ash, of a deep bluish tinge, and free from ingredients tending to give it a brownish hue, substantially as described.

2. A comminuted carbon, consisting of a pulverized residue of the destructive distillation of the hull bran of cotton-seed, substantially as described.

3. A comminuted carbon, consisting of the pulverized residue of the destructive distillation of hull bran of cotton-seed, practically free from ash, substantially as described.

4. A comminuted carbon, consisting of the pulverized residue of the destructive distillation of the hull bran of cotton-seed, practically free from ash, of a deep bluish tinge, and free from ingredients tending to give it a brownish hue, substantially as described.

5. The method of producing comminuted carbon, consisting in subjecting the dried vegetable integuments to destructive distillation without access of air until the flow of distillation products ceases, finely dividing the residue, and removing substantially all of the ash, substantially as described.

6. The method of producing comminuted carbon, consisting in subjecting dried vegetable integuments to destructive distillation without access of air until the flow of distillation products ceases, finely dividing the residue, and removing substantially all of the ash by acid and alkali treatments, substantially as described.

7. The method of producing comminuted carbon, consisting in subjecting dried vegetable integuments to destructive distillation without access of air until the flow of distillation products ceases, pulverizing the residue, treating it with acid and alkali solutions, washing the material neutral, and drying and pulverizing the product, substantially as described.

8. The method of producing comminuted carbon, consisting in subjecting dried vegetable integuments to destructive distillation without access of air until the flow of distillation products ceases, treating the residue with an alkali solution, washing the material, and drying and calcining the product, substantially as described.

9. The method of producing comminuted carbon, consisting in subjecting dried hull bran of cotton-seed to destructive distillation without access of air until the flow of distillation products ceases, and finely dividing the residue, substantially as described.

10. The method of producing comminuted carbon, consisting in subjecting dried hull bran of cotton-seed to destructive distillation without access of air until the flow of distillation products ceases, removing the ash from and finely dividing the residue, substantially as described.

11. The method of producing comminuted carbon, consisting in subjecting dry hull bran of cotton-seed to destructive distillation without access of air until the flow of distillation products ceases, finely dividing the residue, and treating it with acid, substantially as described.

12. The method of producing comminuted carbon, consisting in subjecting dry hull bran of cotton-seed to destructive distillation without access of air until the flow of distillation products ceases, finely dividing the residue, and treating it with an alkali, substantially as described.

13. The method of producing comminuted carbon, consisting in subjecting dry hull bran of cotton-seed to destructive distillation without access of air until the flow of distillation products ceases, finely dividing the residue, and treating it with acid and alkali, substantially as described.

14. The method of producing comminuted carbon, consisting in subjecting dry hull bran of cotton-seed to destructive distillation without access of air until the flow of distillation products ceases, finely dividing the residue, and treating it with acid, then with an alkali, and then with acid, substantially as described.

15. The method of producing comminuted carbon, consisting in subjecting dry hull bran of cotton-seed to destructive distillation without access of air until the flow of distillation products ceases, removing the ash from the residue, and calcining and finely dividing the product, substantially as described.

16. The method of producing comminuted carbon, consisting in subjecting dry hull bran of cotton-seed to destructive distillation without access of air until the flow of distillation products ceases, removing the ash from the residue, calcining, finely dividing, and recalcining the product, substantially as described.

17. The method of producing comminuted carbon, consisting in subjecting dry hull bran of cotton-seed to destructive distillation without access of air until the flow of distillation products ceases, treating the residue with acid and alkali solutions, washing the product neutral, drying, calcining, and finely dividing the product, substantially as described.

18. The method of producing comminuted carbon, consisting in subjecting dry hull bran of cotton-seed to destructive distillation without access of air until the flow of distillation products ceases, treating the residue with acid, then with an alkali, and then with acid, washing the product neutral, drying, calcining, finely dividing and recalcining the product, substantially as described.

19. The method of producing comminuted carbon, consisting in separating the broken hull bran of cotton-seed into two portions of finer and coarser particles, and then subjecting the portion of finer particles to destructive distillation without access of air until the flow of distillation products ceases, and finely dividing the residue, substantially as described.

20. The method of producing comminuted carbon, consisting in separating the broken hull bran of cotton-seed into two portions of finer and coarser particles, and subjecting the portion of finer particles to destructive distillation without access of air until the flow of distillation products ceases, removing the ash from and finely dividing the residue, substantially as described.

21. The method of producing comminuted carbon, consisting in separating the broken hull bran of cotton-seed into two portions of finer and coarser particles, and then independently subjecting each of such portions to destructive distillation without access of water until the flow of distillation products ceases, and finely dividing the residue, substantially as described.

22. The method of producing comminuted carbon, consisting in separating the broken hull bran of cotton-seed into two portions of finer and coarser particles, and then independently subjecting each of such portions to destructive distillation without access of air until the flow of distillation products ceases, and removing the ash from and finely dividing the residue, substantially as described.

23. The method of producing comminuted carbon, consisting in separating the broken hull bran of cotton-seed into two portions of finer and coarser particles, and then independently subjecting each of such portions to destructive distillation without access of air until the flow of distillation products ceases, finely dividing the residue, treating the product with acid and alkali, and calcining, pulverizing, and recalcining the product, substantially as described.

PAUL RALPH HERSHMAN.